(12) United States Patent
Tsao

(10) Patent No.: US 10,926,889 B2
(45) Date of Patent: Feb. 23, 2021

(54) HYBRID HEADLIGHT FOR AIRCRAFT

(71) Applicant: Zodiac Aero Electric, Montreuil (FR)

(72) Inventor: Christian Tsao, Rosny sous Bois (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 15/469,056

(22) Filed: Mar. 24, 2017

(65) Prior Publication Data

US 2017/0275021 A1  Sep. 28, 2017

(30) Foreign Application Priority Data

Mar. 24, 2016  (FR) ..................... 1652556

(51) Int. Cl.
| | | |
|---|---|---|
| *B64D 47/04* | (2006.01) | |
| *G02B 19/00* | (2006.01) | |
| *B64D 47/02* | (2006.01) | |
| *B64D 47/06* | (2006.01) | |
| *G02B 5/02* | (2006.01) | |
| *G02B 27/09* | (2006.01) | |

(52) U.S. Cl.
CPC ............. *B64D 47/04* (2013.01); *B64D 47/02* (2013.01); *B64D 47/06* (2013.01); *G02B 5/0231* (2013.01); *G02B 19/0028* (2013.01); *G02B 19/0066* (2013.01); *G02B 27/0955* (2013.01); *G02B 27/0972* (2013.01)

(58) Field of Classification Search
CPC ........ B64D 47/04; B64D 47/02; B64D 47/06; G02B 19/0009; G02B 19/0061; G02B 27/0916; G02B 27/0955; G02B 27/0972; G02B 19/0028; G02B 19/0066; G02B 5/0231; H04B 7/0885; H04B 7/024; H04B 1/1036; H04B 7/0452; H04W 88/085; H04L 25/03; H04L 43/16

USPC .......................................................... 362/470
See application file for complete search history.

(56) References Cited

U.S. PATENT DOCUMENTS

| | | | |
|---|---|---|---|
| 6,456,437 B1 * | 9/2002 | Lea ........................... | F21V 5/02 |
| | | | 359/625 |
| 6,724,800 B2 * | 4/2004 | Nasu ..................... | H01S 5/0687 |
| | | | 372/107 |
| 7,686,481 B1 * | 3/2010 | Condon .................... | F21V 5/04 |
| | | | 362/331 |
| 2009/0097248 A1 | 4/2009 | Tsao et al. | |
| | (Continued) | | |

FOREIGN PATENT DOCUMENTS

| | | | | |
|---|---|---|---|---|
| EP | 1059484 A1 * | 12/2000 | ............. | F21S 8/033 |
| EP | 1059484 B2 * | 5/2014 | ............. | F21S 8/033 |
| | (Continued) | | | |

OTHER PUBLICATIONS

French Preliminary Search Report and Written Opinion dated Dec. 14, 2016, issued in corresponding French Application No. 16 52556, filed Mar. 24, 2016, 10 pages.

*Primary Examiner* — Rajarshi Chakraborty
*Assistant Examiner* — Glenn D Zimmerman
(74) *Attorney, Agent, or Firm* — Christensen O'Connor Johnson Kindness PLLC

(57) ABSTRACT

This beam shaper for an aircraft headlight comprises a light input surface (3) and a light output surface (6), the output surface comprises prism-shaped areas so as to deflect a light beam transmitted between the light input surface and output surface by guiding the beam in two directions (D1, D2) which are oblique relative to an optical axis (A) of the beam shaper.

6 Claims, 6 Drawing Sheets

(56) References Cited

U.S. PATENT DOCUMENTS

| | | | | |
|---|---|---|---|---|
| 2011/0310332 A1* | 12/2011 | Boyd | .................... | G02B 6/0053 |
| | | | | 349/65 |
| 2012/0313547 A1* | 12/2012 | Barnett | .................... | F21V 31/00 |
| | | | | 315/297 |
| 2014/0313695 A1* | 10/2014 | Wang He | ............. | G02B 5/0215 |
| | | | | 362/97.1 |
| 2016/0068276 A1* | 3/2016 | Tsao | ........................ | B64D 47/02 |
| | | | | 362/470 |
| 2016/0069529 A1* | 3/2016 | Tsao | .................... | F21S 48/2212 |
| | | | | 362/470 |
| 2016/0116666 A1* | 4/2016 | Sato | ..................... | G02B 6/0046 |
| | | | | 362/509 |
| 2016/0195239 A1* | 7/2016 | Jha | ............................. | F21V 7/06 |
| | | | | 362/470 |
| 2017/0269343 A1* | 9/2017 | Kogure | .................. | H05B 33/02 |

FOREIGN PATENT DOCUMENTS

| | | |
|---|---|---|
| FR | 3 025 285 A1 | 3/2016 |
| FR | 3 025 289 A1 | 3/2016 |

\* cited by examiner

HYBRID HEADLIGHT FOR AIRCRAFT

BACKGROUND

The present invention concerns, in a general way, an on-board lighting system for aircraft, and relates more particularly to a beam shaper for an aircraft headlight.

An aircraft lighting system usually comprises a plurality of lighting devices which are activated on the basis of flight or taxiing phases of the aircraft.

Thus, an aircraft usually comprises landing lights arranged on the wings and designed to illuminate the runway when the aircraft is approaching the runway or during take-off, a flashing anti-collision light mounted on top of the rear aileron, and navigation lights mounted on each wing tip.

The lighting system also comprises lighting devices mounted on the nose leg of the aircraft to illuminate the track along which the aircraft travels when taxiing, usually referred to as "taxi lights" in English, and supplementary lighting devices called "runway turnoff lights" (RTO) in English, which provide lateral illumination in taxiing and other phases.

The "taxi" type runway lighting devices are usually mounted on the nosewheel assembly of the aircraft to provide essentially forward illumination for the machine, while the "runway turnoff" lighting devices are usually mounted on the nosewheel assembly or on the leading edges of the wings, being orientated on either side of the front of the aircraft at angles in the range from about 35° to 55°, so as to illuminate the turning phases and thus improve visibility in turns.

The taxi light headlights for taxiing and the runway turn-off headlights for turning are thus activated during taxiing in order to illuminate the taxiways for leaving or accessing a runway. In these phases, the illumination is characterized by a light distribution which has a wide horizontal spread for the purpose of identifying obstacles in the vicinity of the aircraft, mainly in front of the cockpit and in front of the wings. This beam must remain vertically concentrated and must be directed towards the ground, to minimize the risk of dazzling runway personnel moving across the beam.

In the prior art, aircraft lighting systems consist of separate sets of lighting devices which are selectively activated during the flight or taxiing phases.

This is particularly true of taxiing headlights. These headlights may, however, be activated simultaneously to improve visibility.

Evidently, the production of a lighting system in the form of a plurality of lighting devices gives rise to a number of drawbacks, notably due to the fact that the lighting system as a whole has a relatively large overall size and weight.

This is particularly true of taxiing headlights of the taxi and runway turnoff type.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The object of the invention is therefore to enable a plurality of lighting functions to be combined within the same headlight. More particularly, one object of the invention is to provide a taxi and an RTO function within the same headlight, without increasing the overall size of the headlight.

The invention therefore proposes a beam shaper for an aircraft headlight, comprising a light input surface and a light output surface, wherein the output surface comprises prism-shaped areas such that a light beam transmitted between the light input surface and output surface is spread by guiding the beam in two directions which are oblique relative to an optical axis of the beam shaper.

Thus this beam shaper may be used to deflect the beam emitted by a light source without loss of the initial luminous flux, since the final deflection of the light propagation emitted from the beam shaper is produced without interference from the vertices of the neighbouring prisms, the beam thus remaining shaped in a parallel form until it reaches the surface of an area of a striated outer lens of the headlight in which the beam shaper is mounted, which produces the final spread of the RTO beam.

According to another characteristic of the invention, the output surface comprises a set of prisms with triangular bases, extending in a parallel way and forming internal surfaces of total reflection of the light beams.

Advantageously, each of the prisms comprises two prismatic faces delimiting between them a beam deflection angle $\alpha$ of between 45° and 55°, or preferably equal to 52°.

In one embodiment, the prisms are spaced apart by a distance of between 2 and 10 mm, preferably 5 mm.

According to yet another characteristic of the beam shaper according to the invention, the beam shaper comprises a body having three lobes for shaping a light beam emitted from the three respective light sources, these lobes having a common output surface.

Preferably, the body comprises a set of fixing and centring stems extending from the input surface and a set of housings for receiving a light-emitting diode.

The invention also proposes, according to a second aspect, an aircraft headlight comprising a set of light sources having light-emitting diodes and a set of beam shapers for shaping a light beam emitted by the light sources, said set of beam shapers comprising light spreading beam shapers as defined above.

For example the headlight may be made to comprise a first set of beam shapers delivering parallel beams of shaped light at their output and a second set of beam shapers for spreading the light, the first and second sets of beam shapers being mounted in respective areas of the headlight and being activated on the basis of flight and/or taxiing phases of the aircraft.

Advantageously, the headlight is also made to comprise an outer lens having a striated area extending so as to face the deflecting beam shapers on the light output surface side.

DESCRIPTION OF THE DRAWINGS

Other objects, characteristics and advantages of the invention will be apparent from a perusal of the following description, provided solely by way of non-limiting example with reference to the attached drawings, in which.

DETAILED DESCRIPTION

Figure 1:
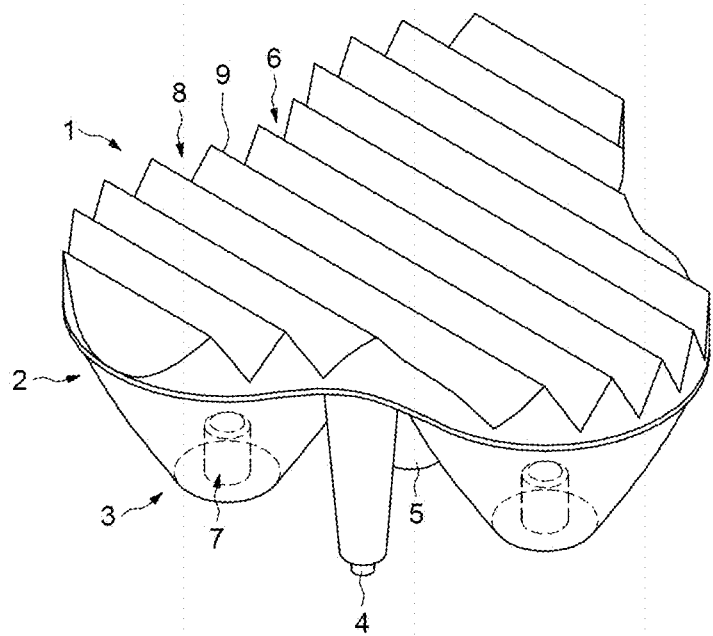
FIGS. 1 and 2 are, respectively, perspective views and top views of a beam shaper of an aircraft headlight according to the invention.
Figure 2:
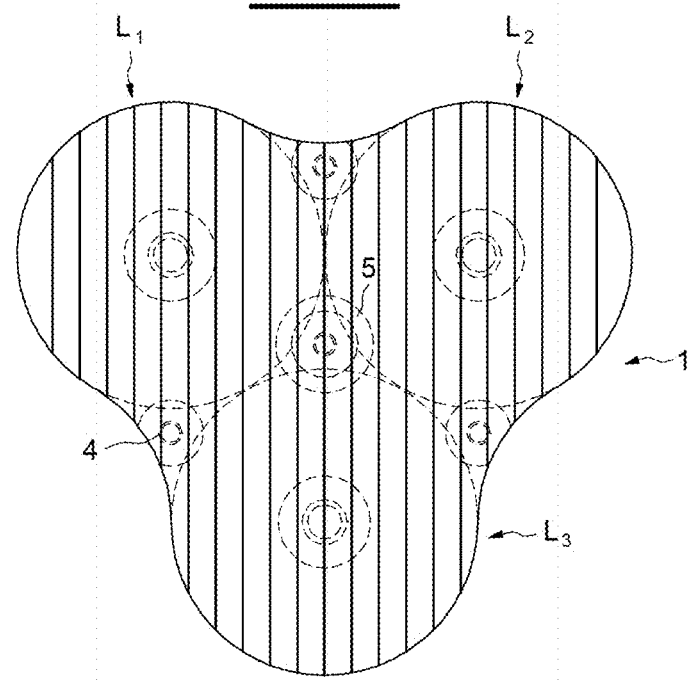
Figure 3:
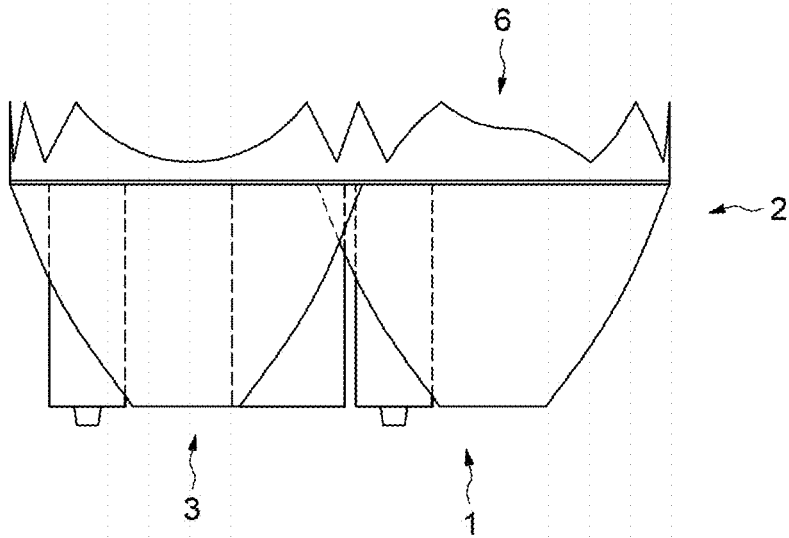
FIGS. 3 and 4 are side views of the beam shaper of FIGS. 2 and 3 in two different orientations.
Figure 4:
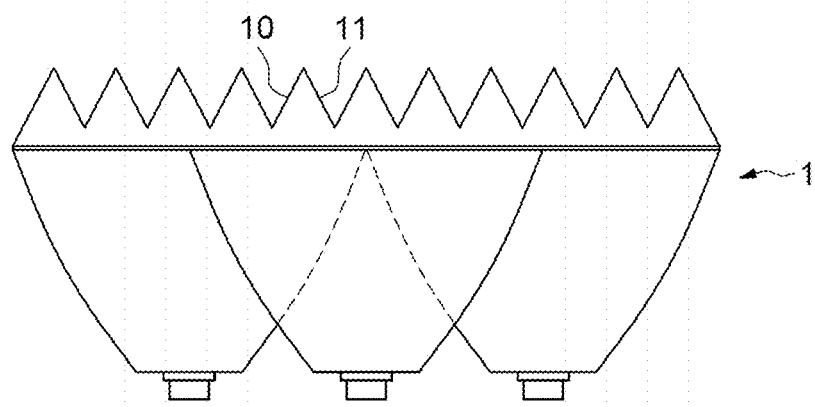

Reference will be made in the first place to FIGS. 1 to 4, which show the general architecture of a beam shaper according to the invention, designated by the general reference numeral 1.

This beam shaper is designed to be mounted in a headlight for external illumination of an aircraft, to provide the runway illumination functions of the taxi and runway turn-off type.

As may be seen, the beam shaper in this case has a structure with three lobes, L1, L2, L3, which respectively shape light beams emitted from light-emitting diodes (not shown).

The beam shaper 1 has a body 2 made in one piece by moulding from a plastic material, advantageously polycarbonate, and has a rear face 3 by means of which the beam shaper is mounted on a circuit bearing LEDs, using fixing and centring stems 4 and 5, and an opposed front face 6 delimiting a common light output surface for the set of lobes L1, L2 and L3.

As may be seen, the rear face 3 of each lobe L1, L2 and L3 has a housing 7 in which a light-emitting diode is housed. The peripheral surface and the base surface of the housing thus form a surface for the input of light into the beam shaper which shapes the light beams delivered by the diodes, and which transmits the light, in the form of parallel beams of shaped light, to the output surface of the beam shaper formed by the front face 6.

As may be seen, the front face 6 of the beam shaper has a set of parallel striations such as those marked 8, thereby forming a set of prisms 9 with triangular bases which extend in a direction of the beam shaper perpendicular to a direction of spreading of a beam.

Each prism 9 has two faces 10 and 11, which form between them a prismatic angle selected on the basis of the deflection or orientation of the beam to be produced.

In this respect, the prismatic faces 10 and 11 may be made to form an angle of between 45° and 55°. Preferably, a prismatic angle of 52° is used, so as to provide peak intensity in an oblique direction relative to the geometric axis of the beam shaper.

Figure 5A:
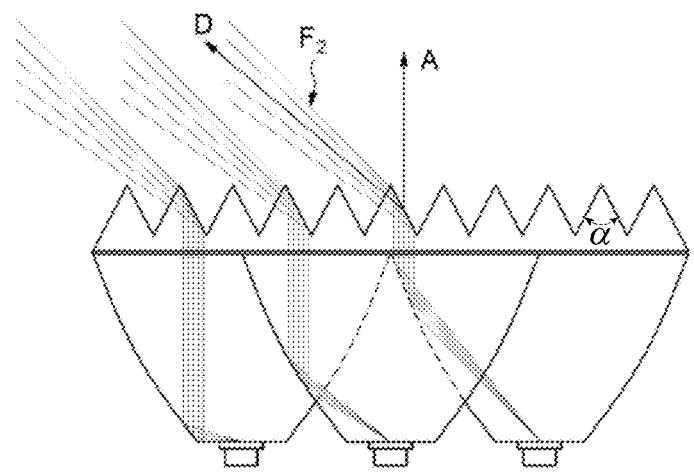
FIGS. 5a and 5b, on the one hand, and FIGS. 6a and 6b, on the other hand, illustrate the principle of forming an RTO beam, and show the spreading of the beam in an oblique direction orientated towards the left and the right respectively.
Figure 5B:
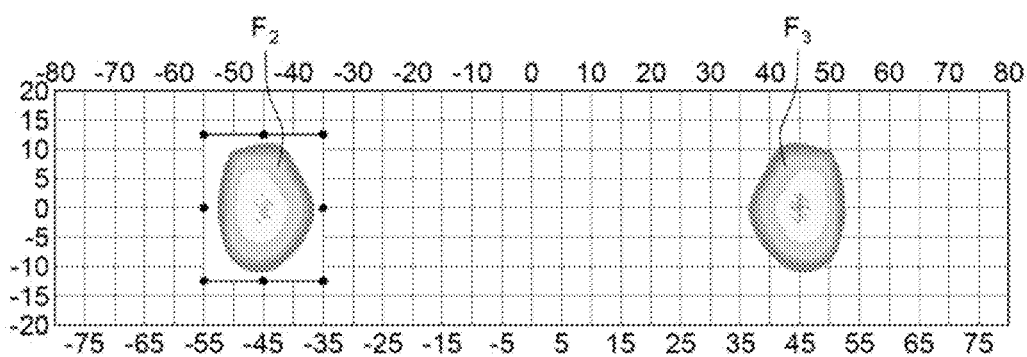
Figure 6A:
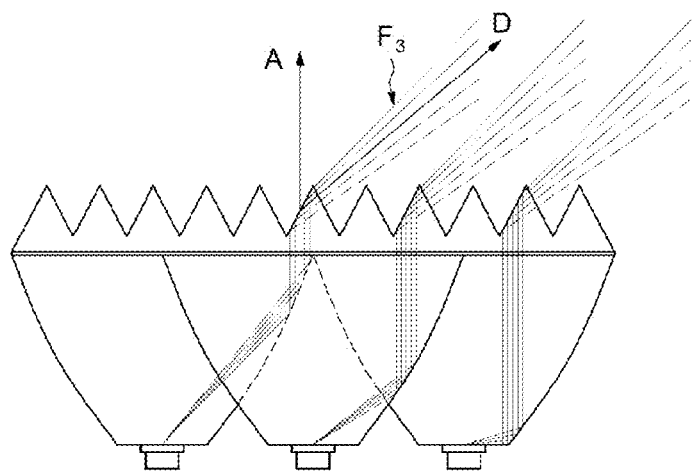
Figure 6B:
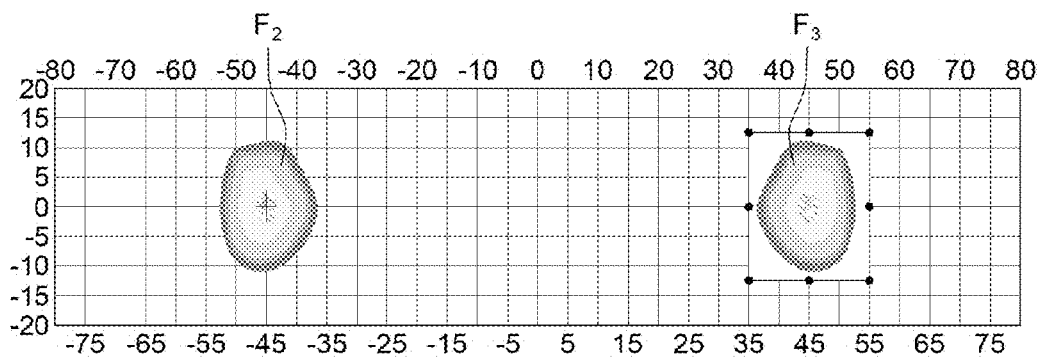

With reference to FIGS. 5a and 5b, on the one hand, and 6a and 6b, on the other hand, it may be seen that the prismatic faces 10 and 11 may be used to guide the beams in an oblique direction D relative to the geometric axis A of the beam shaper and to orientate the beam, respectively, to the left (FIGS. 5a and 5b) and to the right (FIGS. 6a and 6b).

It should be noted that, preferably, the prisms are spaced apart by a distance of between 2 and 10 mm. However, it has been found that a distance of 5 mm between the prisms provides sufficient spread and light output.

Figure 7:
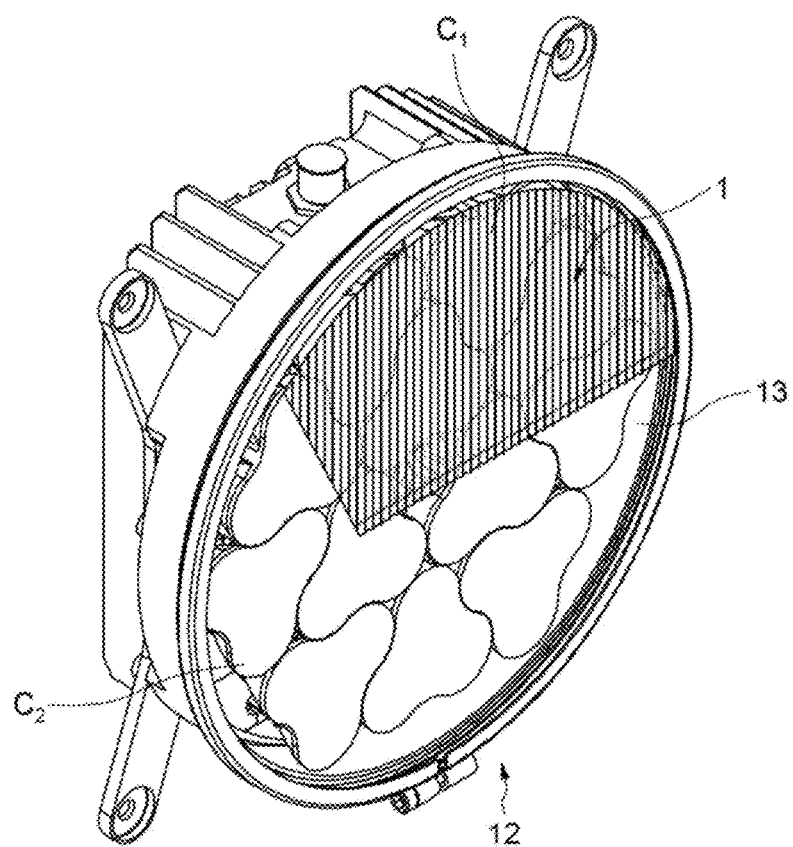
FIG. 7 is a perspective view of a headlight having a beam shaper according to the invention.
Figure 8:
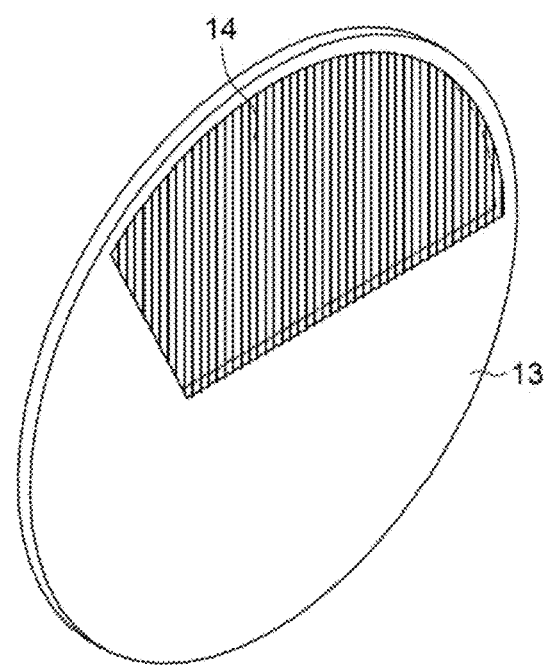
FIG. 8 shows an outer lens mounted to face the light output surface of the beam shapers.

FIGS. 7 and 8 show a hybrid headlight 12 for aircraft which can provide the runway illumination functions of the taxi and RTO types.

As may be seen, this headlight comprises a set of light sources, each comprising a light-emitting diode associated with a beam shaper for shaping the beam emitted by the diode.

The hybrid headlight comprises beam shapers C1 for orientating the light, as described above with reference to FIGS. 1 to 4, and beam shapers C2 capable of shaping the light beam emitted from light-emitting diodes in the form of parallel beams, in respective areas of the headlight. An outer lens 13 comprising a striated area 14 is positioned facing the light output surfaces of the diodes in such a way that the striated area 14 is positioned facing the orientation beam shapers C1. The striated area 14 of this outer lens 13 serves to spread the two beams F2 and F3 of the RTO function.

Figure 9:
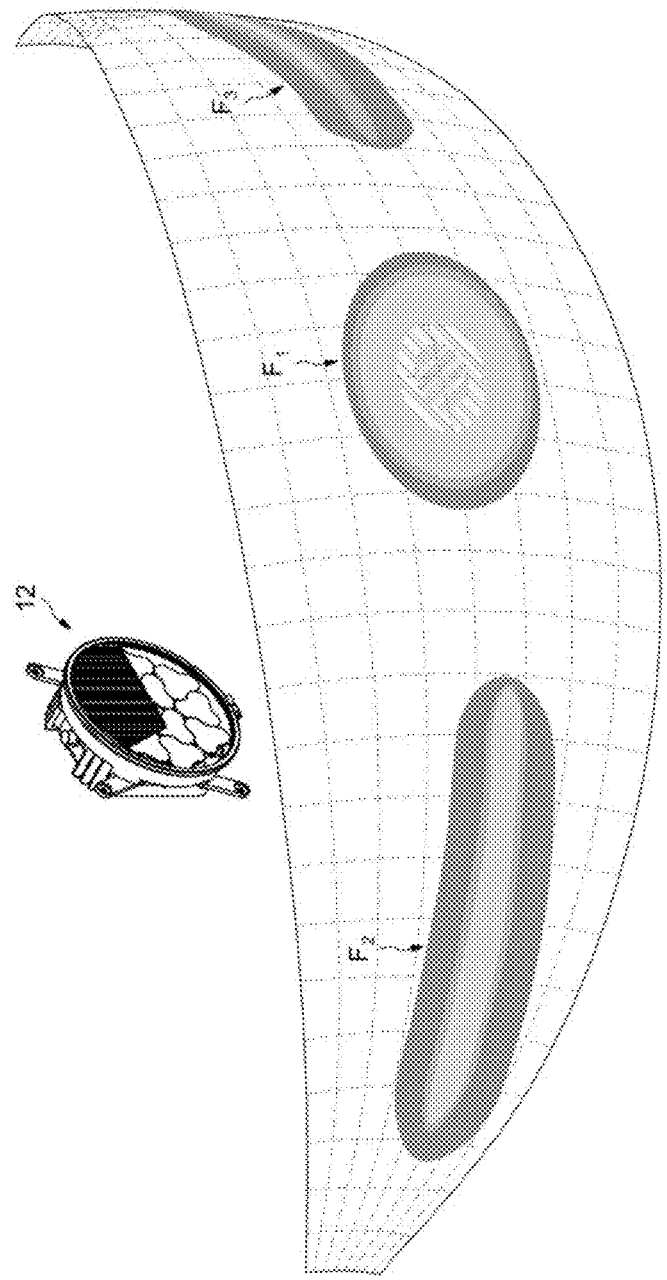
FIG. 9 shows the light beams obtained by means of a headlight according to FIG. 7.

As shown in FIG. 9, because of this arrangement, the headlight is capable of providing a first beam F1, using the diodes associated with the beam shapers C2, and spread beams F2 and F3, using the diodes associated with the spreading beam shapers C1.

It is possible to activate the different areas of the headlight simultaneously to obtain all three beams F1, F2 and F3, or to activate areas selectively to obtain a taxi illumination function (beam F1) or an RTO illumination function (beams F2 and F3).

A hybrid headlight according to the invention may, for example, be produced by using 6 triple light spreading beam shapers C1, each associated with 3 LEDs, and a set of 6 triple beam shapers C2, each of which is also associated with 3 light-emitting diodes, and may therefore comprise 36 light-emitting diodes, all within conventional overall dimensions.

In this respect, it should be noted that the size of the headlights is usually denoted by the PAR number, which denotes the diameter of the headlight in eighths of an inch. Thus the PAR 36 size corresponds to a diameter of 4½ inches, that is to say 114 mm, PAR 46 corresponds to a diameter of 5¾ inches, that is to say 5 145 mm, and PAR 64 corresponds to a diameter of 8 inches, that is to say 203 mm.

A hybrid headlight according to the invention may advantageously be produced in a PAR 64 size, and may therefore have overall dimensions corresponding to a conventional take-off light and thus replace, with reduced weight and overall dimensions, three headlights on the nose leg, namely one taxi light and two right and left runway turn-off lights.

While illustrative embodiments have been illustrated and described, it will be appreciated that various changes can be made therein without departing from the spirit and scope of the invention.

The invention claimed is:

1. An aircraft headlight comprising a set of light sources having light-emitting diodes and a set of beam shapers for shaping the light beam emitted by the light sources, wherein an individual beam shaper comprises a light input surface and a light output surface, characterized in that the output surface comprises prism-shaped areas so as to deflect a light beam transmitted between the light input surface and the light output surface by guiding the beam in two directions which are oblique relative to an optical axis of the beam shaper, wherein the beam shaper is a one-piece molded plastic, and wherein the beam shaper comprises first beam shapers configured to emit light leftwards toward respective bodies of individual beam shapers to form an output left beam and to emit light rightwards toward their respective bodies of the individual beam shapers to form an output right beam, wherein the light output surface comprises a set of prisms with triangular bases, extending in a parallel way and forming internal surfaces for reflection of the light beams, and wherein each of the prisms comprises two prismatic faces delimiting between them a beam deflection angle of between 45° and 55° providing a peak intensity in an oblique direction relative to a geometric axis of the beam shaper, wherein the prisms are separated by a distance of between 2 and 10 mm, and wherein the aircraft headlight is in a PAR 64 size.

2. The aircraft headlight of claim 1, wherein the beam shaper comprises a body having three lobes for shaping light beams emitted from three respective light sources, these lobes having a common output surface.

3. The aircraft headlight of claim 1, wherein the set of beam shapers comprises a second set of beam shapers configured to generate a taxi illumination beam that is centrally oriented with respect to the aircraft headlight.

4. The aircraft headlight of claim 2, wherein the body comprises a set of fixing and centering stems extending from the input surface and a set of housings for receiving a light-emitting diode.

5. The aircraft headlight of claim 3, further comprising an outer lens having a striated area, extending so as to face the orientating beam shapers.

6. A beam shaper for shaping a light beam emitted by light sources comprising a light input surface and a light output surface, characterized in that the output surface comprises prism-shaped areas so as to deflect a light beam transmitted between the light input surface and the light output surface by guiding the beam in two directions which are oblique relative to an optical axis of the beam shaper, wherein the beam shaper is configured to emit light leftwards from a body of the beam shaper to form an output left beam and to emit light rightwards from the body of the beam shaper to form an output right beam, and wherein the light output surface comprises a set of prisms with triangular bases, extending in a parallel way and forming internal surfaces for reflection of the light beams and providing a peak intensity in an oblique direction relative to a geometric axis of the beam shaper.

* * * * *